Feb. 7, 1961 A. PINSON ET AL 2,970,357

LINE CLAMP

Filed May 26, 1959 2 Sheets-Sheet 1

INVENTORS
ABRAHAM PINSON
BERNARD STOUDT
BY

ATTORNEY

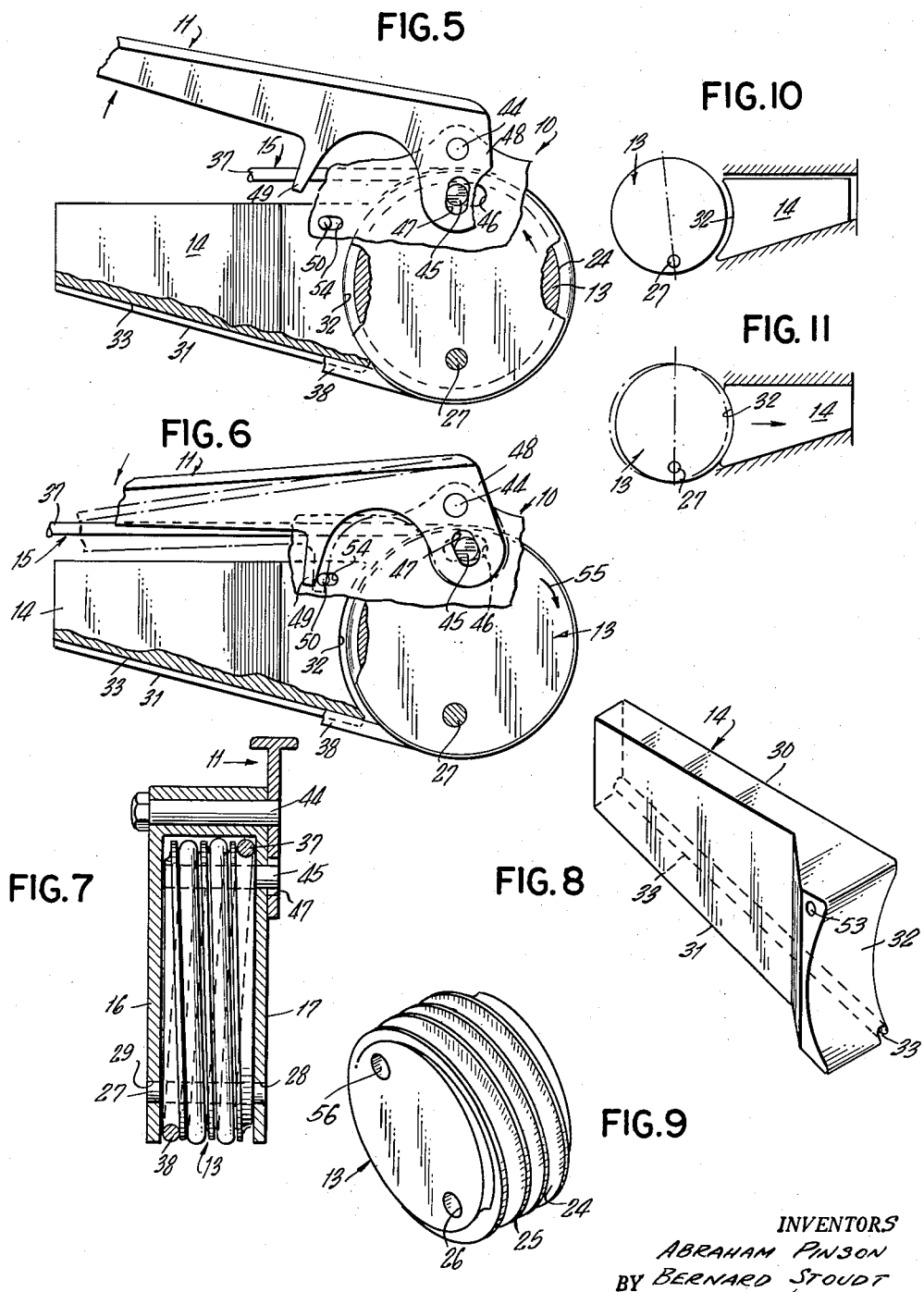

United States Patent Office 2,970,357
Patented Feb. 7, 1961

2,970,357
LINE CLAMP

Abraham Pinson, 26 Hunter Ave., New Rochelle, N.Y., and Bernard Stoudt, Elmont, N.Y.; said Bernard Stoudt assignor to said Abraham Pinson Filed May 26, 1959, Ser. No. 815,980

11 Claims. (Cl. 24—126)

This invention relates to a a line clamping device and more particularly to a device adapted to clamp and frictionally retain a cable, wire, rope or similar filamentary device as it is brought in taut condition and to selectively release said cable completely or in a stepwise manner.

Clamping devices for clamping ropes, cables or wires have found wide utility. Such devices are particularly useful in connection with structures such as poles, masts or similar devices which are retained in position by means of guy wires, cables or ropes attached thereto and anchored to suitable fixed points. It is essential in the use of such guy wires, etc., that the supporting cable or device be initially placed into a taut or tensioned condition and immediately clamped. It is also desirable to take up the slack which may develop in such cables from time to time during use and to clamp said cable in such adjusted condition. For this purpose, a clamp is interposed at some point along the cable. The utility, ease of operation and safety of such device is materially enhanced by the provision of an arrangement whereby the cable may be clamped automatically without manual manipulation of the device and which is capable of completely releasing the cable or releasing it gradually and in a stepwise manner as desired and at the option of the user thereof.

The problems involved in obtaining effective clamping action are particularly pronounced in connection with lines, wires and cables which are coated or jacketed with protective plastic materials. These covering materials, such as nylon, Teflon, etc., present surfaces having a low coefficient of friction making it particularly difficult to achieve effective clamping action without injury to the covering material.

It is an object of this invention to provide a clamp adapted to be secured to an anchoring or similar device and through which the end portion of a cable to be clamped may be readily passed in order to clamp said cable immediately as it is brought under desired tension and to release said cable completely or in a stepwise manner at the option of the user by a simple manipulation of the device.

It is an additional object of this invention to provide a device of the character indicated having a minimum number of parts which will securely retain a cable under desired tension and whereby said cable may be brought into tensioned condition from time to time as slack may develop thereon by simply drawing upon said cable thus eliminating the necessity for turnbuckles or similar tensioning devices.

It is also an object of this invention to provide a cable clamp of the character indicated which may be placed into use by a single operator and which will serve to clamp the cable automatically as the cable is brought under tension and which may be similarly released by a single operator either completely or in a stepwise manner; provision also being made for locking the device in cable clamping condition.

A further object of this invention is to provide a cable clamp of the character indicated whereby the condition of the cable is under the complete control of the operator at all times and such control may be exercised by the manipulation of plier like arms.

It is also an object of this invention to achieve the foregoing objects in conjunction with lines, wires or cables coated with materials presenting surfaces having a low coefficient of friction.

Further and more specific objects, features and advantages will more clearly appear from a consideration of the detailed specification hereinafter set forth especially when taken in connection with the accompanying drawings which illustrate a preferred form which the invention may assume and which form part of the specification.

In the accompanying drawings:

Figure 5 is a fragmentary view of the opposing face of the device with the bottom wall broken away in line clamping condition;

Figure 6 is a view similar to Figure 5, showing the operation of the release arm;

Figure 7 is a cross-section of the device taken along line 7—7 of Figure 1;

Figure 8 is a perspective view of the locking wedge portion of the device;

Figure 9 is a perspective view of the drum portion of the device; and

Figures 10 and 11 are diagrammatic views of the drum and wedge showing their relative position.

Figure 1:
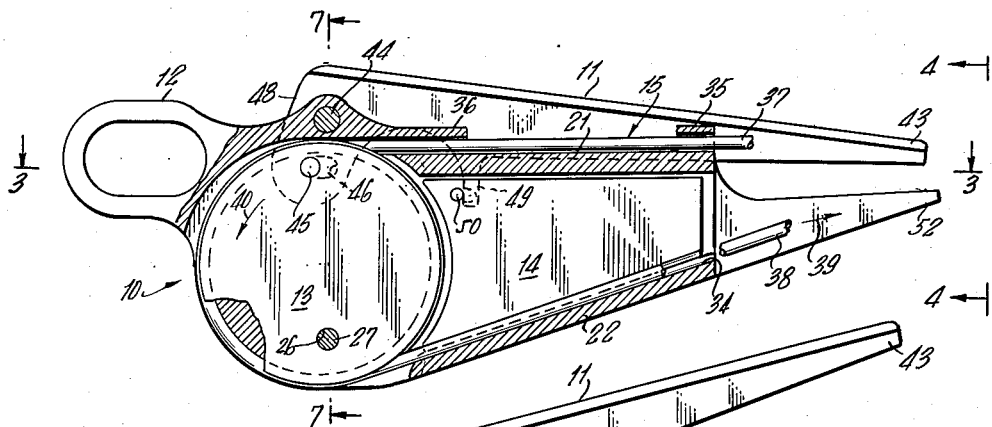
Figure 1 is a horizontal section of the device partly broken away, showing the released condition of the clamp as it is threaded.

The line clamp comprising the present invention is illustrated in Figures 1–4 and comprises a generally flat elongated housing designated generally by the numeral 10 upon which a release arm 11 is pivotally mounted. The housing 10 is also provided with an eye extension 12 in order to permit the clamp to be secured to an anchoring device, not shown. Disposed within the housing in a manner hereinafter to be more fully described is an arrangement comprising drum 13 and locking wedge 14 whereby a rope, cable, guy wire or similar line 15, having one end attached to a supported structure, is threaded through the line clamp device and is manually limited to unidirectional movement therethrough. The slack in a line of this character may thus be drawn up and the line placed in taut condition and clamped automatically. Release of the line is effected by means of the operation of the release arm 11, all as will be more particularly hereinafter described.

Housing 10 includes a bottom planar face wall 16 and a top face wall 17 which is disposed in parallel spaced relation thereto. The portion 18 at the head end of the top face wall overlying the drum 13 and head end of locking wedge 14 is spaced from the bottom face wall 16 a somewhat greater distance than is the tail portion of said top wall, being connected thereto by means of a transition portion 20. The face walls 16 and 17 are interconnected by means of side walls 21 and 22. Side wall 21 is in parallel alignment with the axis of the housing whereas side wall 22 is angularly inclined with respect thereto to form a wedge-shaped enclosure. Side wall 22 is interrupted to form a swallow 23, the purpose of which will more clearly appear hereafter.

Drum 13 is mounted within the head end of the housing for eccentric pivotal movement on an axis transverse to the axis of the housing and is more particularly illustrated in Figures 1, 2, 3 and 9. Said drum 13 comprises a cylindrical body provided with planar end walls and a circumferential helical groove 24. Helical groove 24 is advantageously formed with three turns, the lands 25 of which merge with the planar face walls of the cylindrical body comprising the drum. An eccentrically disposed axially aligned aperture 26 extends entirely through the cylindrical body of the drum 13 so that said drum may be eccentrically mounted for pivotal movement within the housing about a pivot pin 27 inserted through registering apertures 28 and 29 provided in the top and bottom face walls of the housing. The disposition of the pivot pin 27 may be more clearly seen in Figure 7. It will be apparent that the drum 13 is thus eccentrically mounted for restricted pivotal movement about the axis defined by said pin. The pivot pin and drum aperture within which it is disposed are in alignment with the axis of the cylindrical drum but offset from its center to a point adjacent the peripheral edge thereof.

Locking wedge 14 is disposed within the tail end of the housing and is free for limited axial sliding movement therein. As may be seen from Figures 1, 2, 3 and 8, said locking wedge comprises an elongated member of a complementary configuration to the wedge-shaped space defined in the tail end of the housing and includes a side wall 30, which is in parallel alignment with the longitudinally extending axis of the wedge and housing, as well as side wall 31 which is inclined with respect to said axis, thereby forming a relatively flat wedge-shaped element having convergent side wall. It will be noted that the head end of the wedge 14 is enlarged to the same thickness as the locking drum and that it is provided with a concavely arcuate end face or wall 32 which is complementary in configuration to the cylindrical peripheral side wall 24 of drum 13. Said locking wedge 14 is additionally provided with a longitudinally extending groove 33 formed in the side wall adjacent the bottom face of the wedge. A complementary groove 34 is provided along the interior of inclined side wall 22 of the housing.

The relative operative positions of the drum 13 and wedge 14 within the housing are diagrammatically illustrated in Figures 10 and 11. It will be apparent from Figure 10 that with the drum pivotally moved in the direction of the head end of the housing, the space between the circumferential peripheral surface of the cylinder and the concavely arcuate head of the wedge is enlarged and simultaneously the wedge itself is free for longitudinal sliding movement in the same direction to enlarge the space between the interior surface of the housing side wall and the inclined side wall of the wedge. However, when the drum is pivoted in the opposing direction toward the tail end of the housing, as in Figure 11, the peripheral surface of the drum or the line reeved therearound contacts the concavely arcuate face at the head end of the wedge thereby forcing said wedge to move in a similar direction and causing the side wall of the wedge to approach the interior surface of the confronting housing side wall. It is this interaction between the drum and wedge which produces the unidirectional locking action for the line or cable passed therethrough in the manner to be now more particularly described.

Figure 2:
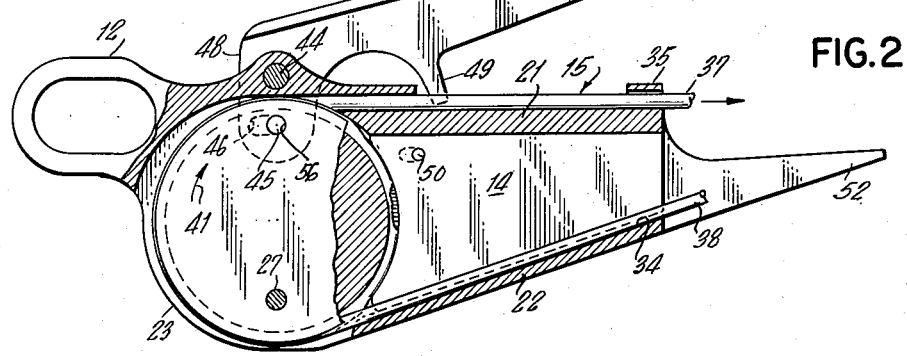
Figure 2 is a horizontal section similar to Figure 1, showing the device in line clamping condition.
Figure 3:
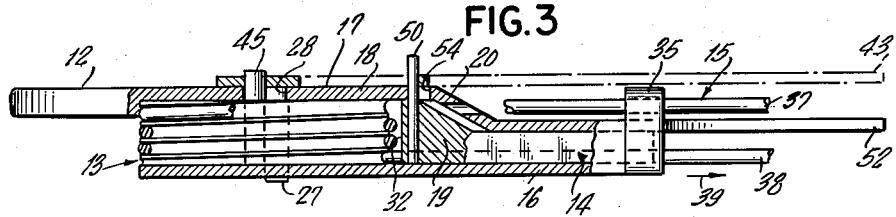
Figure 3 is a cross-section of the device taken along line 3—3 of Figure 1.
Figure 4:
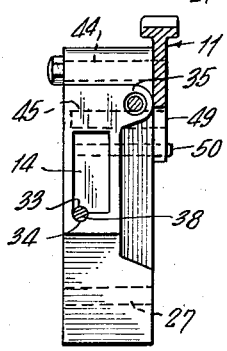
Figure 4 is an end view of the device partly in section taken along line 4—4 of Figure 1.

In placing the clamp into operation, the end 37 of a line or cable 15 is secured to the structure to be supported and the free end 38 thereof is initially threaded through apertured boss 35 and inserted into the interior of the housing through aperture 36 formed in the head end of the side wall. The end of the cable thus inserted passes around the convolution of the drum adjacent the top face wall and emerges through the swallow 23 of the housing. The free end 38 of the cable 15 is then reinserted between the housing and the drum and will follow the helical groove on the drum as it emerges and is reinserted through said swallow 23. The cable is thus reeved around the three convolutions of the helically grooved drum and the end thereof automatically passes into the space provided by the complementary elongated grooves 33 and 34 formed in the side wall 31 of the wedge and the interior face of the side wall 22 of the housing from whence it emerges at the tail end of the housing as shown in Figures 2, 3 and 4. The clamp as threaded in this manner is shown in Figure 1. It will be apparent from said figure that when the drum is pivoted away from the wedge, the wedge is released from clamped condition and a clearance space is formed between the drum and the wedge and the wedge may then move toward the head end of the housing so as to provide an enlarged space between the inclined walls of the wedge and housing. Thus, the free end 38 of the cable 15 can be drawn in the direction indicated by the arrow 39 in Figure 1. When the cable is drawn in indicated direction, it causes the drum to be maintained in pivoted condition in the direction indicated by the arrow 40 and thereby permitting the free movement of the wedge toward the head end of the housing so that the cable may move freely through the complementary grooves 33 and 34 as well as around the drum. The slack may thus be drawn up upon the portion 37 of the cable the end of which is secured as a guy wire or the like to a mast or similar support or a structure. After all the slack on portion 37 of the cable 15 has been thus manually drawn up, the free end 38 may then be manually released. When the free end is thus released, the tension on the secured portion 37 of the cable 15 acting in the direction indicated by the arrow 41 in Figure 2 causes the drum to be pivoted in the opposing direction thereby bringing the convolutions of the cable disposed around the drum in confronting relation with the concavely arcuate face 32 of the wedge into contact therewith and causing the wedge to be moved toward the tail end of the housing thereby reducing the space between the inclined walls of the wedge and housing and exerting a clamping action on the cable along the entire length of the complementary longitudinal grooves 33 and 34. Thus, a clamping force is applied to the cable in the region between the drum and the arcuate face of the wedge as well as along the length of said grooved side wall. The increased tension upon the secured portion 38 of the cable as by the sway or movement of the mast or other structure to which said cable is attached will cause an increase in the clamping force applied along the cable surface.

It will be seen from the foregoing that the cable passed through the clamp in accordance with the present invention is normally limited to a unidirectional movement therethrough. The cable may be readily placed in taut condition with respect to the structure to which it is attached by manually drawing on the free end thereof to take up the slack. The tension on the cable automatically operates the clamp to prevent movement thereof in the opposing direction. Increased tension on the supporting end of the cable merely serves to increase the clamping force upon the cable.

This instant clamp is particularly adapted for use in conjunction with plastic coated cables which present surfaces having a low coefficient of friction. Such cables are currently being produced and placed into use, as for example, nylon or "Teflon" coated or jacketed cables. Conventional forms of clamping devices have been found inadequate to hold these cables in view of the low coefficient of friction presented by their surfaces. Furthermore, the application of considerable pressures by such devices on restricted surface areas of such plastic covered cables have caused the plastic sheathing to flow or to be extruded. With some clamp arrangement the forces cause a separation of the coating material from the cable body causing crimping or other damage to the cable or its plastic sheath. The clamping pressures applied by the instant device are so applied and distributed over extended areas as to result in efficient clamping action without cable damage.

The release of the clamped cable is accomplished by means of release arm 11. Said arm 11 comprises an elongated member 43, one end of which is pivotally mounted on the head end of the housing by means of a pivot pin 44. A projecting pin or boss 45 is seated in an aperture 56 formed in drum 13 and projects through a guide slot 46 formed in the housing wall entering the slot 47 formed in projecting leg 48 of the release arm. Said release arm is also provided with a projecting extension 49 in registration with pin 50 seated in aperture 53 in the head end of wedge 14 and projecting through aperture 54 in the housing wall 17. The slot 47 and extension 49 are so disposed that when the arm 11 is pivoted toward the housing body the boss 45 will pivot the drum to release position in the direction of the arrow 55 in Figure 6. The continued movement of the arm causes the extension 49 to bear against pin 50 and thereby causes the wedge 14 to be moved toward the head end of the housing releasing the cable from clamped condition. In order to facilitate the release movement of the release arm, the housing is provided with an elongated extension 52 which, together with the release arm, form complementary plier like handles whereby the clamp may be released by merely pressing said handles toward each other. As soon as manual pressure upon the release arm is discontinued, the tension upon the secured end of the cable immediately moves the drum and wedge respectively to their clamping positions simultaneously causing the handles to separate and the release arm to assume its open position. Consequently, a stepping release action may be imparted to the cable by merely momentarily pressing the release arms toward the housing arm. Thus, cables under high tension may be gradually released without danger of backlash from the cable. The release arm further serves the purpose of permitting the clamp to be more readily threaded in that the drum and wedge may be maintained in released position during the threading operation.

While we have here shown and described a preferred embodiment of our invention, it will be apparent however that this invention is not limited to this embodiment and that many changes, additions and modifications can be made in connection therewith without departing from the spirit and scope of the invention as herein disclosed and hereinafter claimed. Having described our invention what we claim as new and desire to secure by Letters Patent is:

1. A line clamping device comprising a hollow housing, an eccentrically pivoted drum disposed within one end of said housing said drum being provided with a helically grooved side wall and a reciprocable wedge disposed within the other end thereof, the enlarged end of said wedge being in confronting relation with a portion of the periphery of a line reeved around said drum whereby when said drum is pivoted in one direction, the abutting contact between said peripheral portion and the enlarged end of said wedge causes said wedge to be moved into wedging engagement with interior walls of said housing, said drum permitting the wedge to be moved in the opposing direction and out of such wedging engagement when pivoted in the opposing direction, said device being adapted to receive one end of a line reeved around said drum and disposed in the space between a wall of said wedge and the interior of a wall of said housing whereby said line may be clamped against movement, a force applied to said line in one direction causing said drum and wedge to be moved in said one direction thereby preventing the movement of said line through said housing and clamping the same, the application of force to said line in the opposing direction causing said drum and wedge to be moved in the opposing direction thereby releasing said line from clamped condition and permitting it to be drawn through said housing.

2. A line clamping device comprising a hollow housing, an eccentrically pivoted drum disposed within one end of said housing said drum being provided with a helically grooved side wall and a reciprocable wedge disposed within the other end thereof, the enlarged end of said wedge being in confronting relation with a portion of the periphery of a line reeved around said drum whereby when said drum is pivoted in one direction, the abutting contact between said peripheral portion and the enlarged end of said wedge causes said wedge to be moved into wedging engagement with interior walls of said housing, said drum permitting the wedge to be moved in the opposing direction and out of such wedging engagement when pivoted in the opposing direction, said device being adapted to receive one end of a line reeved around said drum and disposed in the space between a wall of said wedge and the interior of a wall of said housing whereby said line may be clamped against movement, a force applied to said line in one direction causing said drum and wedge to be moved in said one direction thereby preventing the movement of said line through said housing and clamping the same, the application of force to said line in the opposing direction causing said drum and wedge to be moved in the opposing direction thereby releasing said line from clamped condition and permitting it to be drawn through said housing, a release arm member pivotably mounted on said housing operatively associated with said drum and wedge, said release arm member causing said drum and wedge to be moved to release said line from clamped condition.

3. A line clamping device comprising a housing including top and bottom face walls and side walls interconnecting said face walls in parallel spaced relation, at least one of said side walls having a portion angularly inclined with respect to the longitudinal axis of said housing thereby defining a wedge-shaped space within said housing, a drum disposed within one end of said housing mounted for eccentric pivotal movement on an axis transverse to the longitudinal axis of the housing, said drum comprising a cylindrical body provided with planar end walls and a side wall having a helical groove formed therein, a wedge-shaped element disposed within the other end of said housing for limited axial reciprocal movement therein, said wedge-shaped element comprising an elongated element complementary to the wedge-shaped space defined in said other end of said housing, one end of said wedge element being concavely arcuate and of complementary configuration to a portion of the peripheral side wall of said drum and in confronting relation therewith whereby said wedge element is adapted to be axially moved upon the eccentric pivoted movement of said drum.

4. A device according to claim 3 wherein said one end of said housing is provided with an anchor eye extension.

5. A device according to claim 3 wherein one of said side walls is interrupted to form a swallow.

6. A device according to claim 3 wherein confronting wedging surfaces of said wedge and housing are provided with complementary grooves for the reception of a line therebetween.

7. A device according to claim 3 wherein a line to be releasably clamped extends into said housing through said swallow and is reeved around said drum and is disposed in the space intermediate said wedge and the interior of the housing wall extending externally of said housing through said other end thereof.

8. A line clamping device comprising a housing including top and bottom face walls and side walls interconnecting said face walls in parallel spaced relation, at least one of said side walls having a portion angularly inclined with respect to the longitudinal axis of said housing thereby defining a wedge-shaped space within said housing, one of said side walls being interrupted to form a swallow, a drum disposed within one end of said housing mounted for eccentric pivotal movement on an axis transverse to the longitudinal axis of the housing, said drum comprising a cylindrical body provided with planar end walls, and a side wall having a helical groove formed therein, a wedge element disposed within the other end of said housing for limited axial reciprocal movement therein, said wedge element comprising an elongated element complementary to the wedge-shaped space defined in the tail end of said housing, one end of said wedge element being concavely arcuate of complementary configuration to a portion of the peripheral side wall of said drum and in confronting relation therewith whereby said wedge element is adapted to be axially moved upon the eccentric pivoted movement of said drum, a release arm comprising a member pivotably mounted on said one end of said housing, a pin projecting from an end wall of said drum and eccentrically disposed with respect to the axis thereof, one of the face walls of said housing being provided with an aperture therethrough whereby an end of said pin extends externally of said housing, said pin being disposed for abutment with a portion of said release arm member whereby said drum is pivotally moved upon the pivotal movement of said member.

9. A device according to claim 8 wherein said housing is provided with an extended portion of substantially complementary configuration to said release arm whereby said extension and release arm member together comprise plier-like handles to facilitate the operation of said release arm.

10. A line clamping device comprising a housing including top and bottom face walls and side walls interconnecting said face walls in parallel spaced relation, at least one of said side walls having a portion angularly inclined with respect to the longitudinal axis of said housing thereby defining a wedge-shaped space within said housing, one of said side walls being interrupted to form a swallow, a drum disposed within one end of said housing mounted for eccentric pivotal movement on an axis transverse to the longitudinal axis of the housing, said drum comprising a cylindrical body provided with planar end walls, and a side wall having a helical groove formed therein, a wedge element disposed within the other end of said housing for limited axial reciprocal movement therein, said wedge element comprising an elongated element complementary to the wedge-shaped space defined in said other end of said housing, one end of said wedge element being concavely arcuate of complementary configuration to a portion of the peripheral side wall of said drum and in confronting relation therewith whereby said wedge element is adapted to be axially moved upon the eccentric pivoted movement of said drum, a release arm comprising a member pivotably mounted on said one end of said housing, a pin projecting from an end wall of said drum and eccentrically disposed with respect to the axis thereof, one of the face walls of said housing being provided with an aperture therethrough whereby an end of said pin extends externally of said housing, said pin being disposed for abutment with a portion of said release arm member, a pin projecting from said wedge and extending externally of said housing through an aperture provided in a face wall thereof, said pin being disposed for abutment with another portion of said release arm member, the arrangement being such that upon the pivotal movement of said release arm member in one direction the pin carried by said drum will first engage a portion of the release arm member thereby moving said drum out of contact with said wedge, the continued movement of said release arm causing abutting contact to be made with the pin projecting from said wedge thereby causing said wedge to be moved axially out of wedging contact with the interior surfaces of the side walls of said housing.

11. A line clamp comprising a hollow housing including top and bottom face walls and side walls interconnecting said face walls in parallel spaced relation, said housing having a head end and a tail end, one of said side walls being in parallel alignment with the longitudinal axis of the housing, the opposing side wall being angularly inclined with respect thereto to form an enclosure having an enlarged space defined at the head end thereof and a wedge-shaped space defined at the tail end thereof, one of said side walls being interrupted to form a swallow, a drum element disposed within the head end of said housing, said drum comprising a cylindrical body provided with planar end walls and a helically grooved side wall as well as an eccentrically disposed axially aligned aperture, a pivot pin extending through said aperture, the ends of said pin being received in registering apertures provided in the opposing face walls of said housing whereby said drum is mounted for limited eccentric pivotal movement within said housing, a locking wedge disposed within the tail end of said housing, said locking wedge comprising a relatively flat elongated member being of complementary configuration to the wedge-shaped spaced defined in the tail end of said housing and including a side wall in parallel alignment with the longitudinal axis of the wedge and housing and a side wall inclined with respect to said axis whereby the side walls of said wedge are convergent in the direction of the tail end of said wedge and housing, the head end of said wedge being of the same thickness as said drum and being provided with a complementary concavely arcuate end wall in confronting relation with the side wall of said drum, said wedge being provided with a longitudinally extending groove along the inclined side wall thereof and the interior of the inclined side wall of said housing being provided with a complementary groove, said wedge being disposed within said housing for limited reciprocal movement whereby the abutment of said drum side wall with the arcuate end wall of said wedge upon the eccentric pivotal movement of said drum in one direction causes said wedge to be moved in the direction of the tail end of said housing and to approach the interior surfaces of the side wall thereof and the eccentric pivotal movement of said drum in the opposing direction releases said wedge for movement in the opposing direction away from said interior surfaces.

References Cited in the file of this patent

UNITED STATES PATENTS

| | | |
|---|---|---|
| 1,060,386 | Watchel | Apr. 29, 1913 |
| 2,193,407 | Hagen | Mar. 12, 1940 |
| 2,540,887 | Hyatt | Feb. 6, 1951 |
| 2,540,888 | Hyatt | Feb. 6, 1951 |

FOREIGN PATENTS

| | | |
|---|---|---|
| 120,857 | Germany | June 10, 1901 |